(12) United States Patent
Domercq et al.

(10) Patent No.: US 8,945,670 B2
(45) Date of Patent: Feb. 3, 2015

(54) PROCESS FOR THE PRODUCTION OF A DEPOSIT OF INORGANIC NANOPARTICLES HAVING MICRO GAPS ONTO A LIGHT-TRANSPARENT SUPPORT

(75) Inventors: Benoit Domercq, Jumet (BE); Ingrid Marenne, Jumet (BE); Samuel Martinquet, Jumet (BE); Guillaume Lamblin, Ixelles (BE); Christine Dupont, Ottignies (BE)

(73) Assignee: AGC Glass Europe, Brussels (BE)

( * ) Notice: Subject to any disclaimer, the term of this patent is extended or adjusted under 35 U.S.C. 154(b) by 34 days.

(21) Appl. No.: 13/806,478

(22) PCT Filed: Jul. 18, 2011

(86) PCT No.: PCT/EP2011/062197
§ 371 (c)(1),
(2), (4) Date: Dec. 21, 2012

(87) PCT Pub. No.: WO2012/010533
PCT Pub. Date: Jan. 26, 2012

(65) Prior Publication Data
US 2013/0108832 A1 May 2, 2013

(30) Foreign Application Priority Data

Jul. 19, 2010 (BE) .................................. 2010/0445

(51) Int. Cl.
*B05D 1/12* (2006.01)
*B05D 3/00* (2006.01)
(Continued)

(52) U.S. Cl.
CPC ............... *B05D 1/007* (2013.01); *C03C 17/001* (2013.01); *C03C 17/006* (2013.01); *G02B 1/11* (2013.01); *C03C 2217/425* (2013.01)
USPC ........... 427/180; 427/189; 427/195; 427/202; 427/203

(58) Field of Classification Search
None
See application file for complete search history.

(56) References Cited

U.S. PATENT DOCUMENTS

2007/0104922 A1   5/2007   Zhai et al.
(Continued)

OTHER PUBLICATIONS

Zhai, L. et al., "Stable Superhydrophobic Coatings from Polyelectrolyte Multilayers,", NANO Letters, American Chemical Society, vol. 4, No. 7, pp. 1349 to 1353, (2004) XP-002530271.
(Continued)

*Primary Examiner* — Duy Deo
(74) *Attorney, Agent, or Firm* — Oblon, Spivak, McClelland, Maier & Neustadt, L.L.P.

(57) ABSTRACT

The invention relates to a process for the production of a transparent support covered with a deposit of inorganic nanoparticles, said deposit having micro gaps, comprising the following steps:
application of a solution of polyelectrolyte having ionized functional groups to a transparent support, followed by at least one washing and drying step to form a charged polyelectrolyte deposit on said support;
application of a solution of polymer microparticles having ionized groups with charges opposed to those of the polyelectrolyte deposit to said polyelectrolyte deposit, followed by at least one washing step for the formation of a deposit of charged polymer microparticles on the polyelectrolyte deposit;
covering the deposit of charged polymer microparticles with a solution of polyelectrolyte having ionized functional groups with charges opposed to those of the charged polymer microparticles of step (b), followed by at least one washing and drying step to form a charged polyelectrolyte deposit;
application of a solution of ionized inorganic nanoparticles having surface charges opposed to those of the charges of the polyelectrolyte of step (c) to the charged polyelectrolyte deposit, followed by at least one washing step to form at least one layer of ionized inorganic nanoparticles;
removal of the deposit of polymer microparticles of step (b) and the deposits of polyelectrolyte of steps (a) and (c) to obtain the deposit of inorganic nanoparticles having micro gaps.

17 Claims, 8 Drawing Sheets

Figure 1:
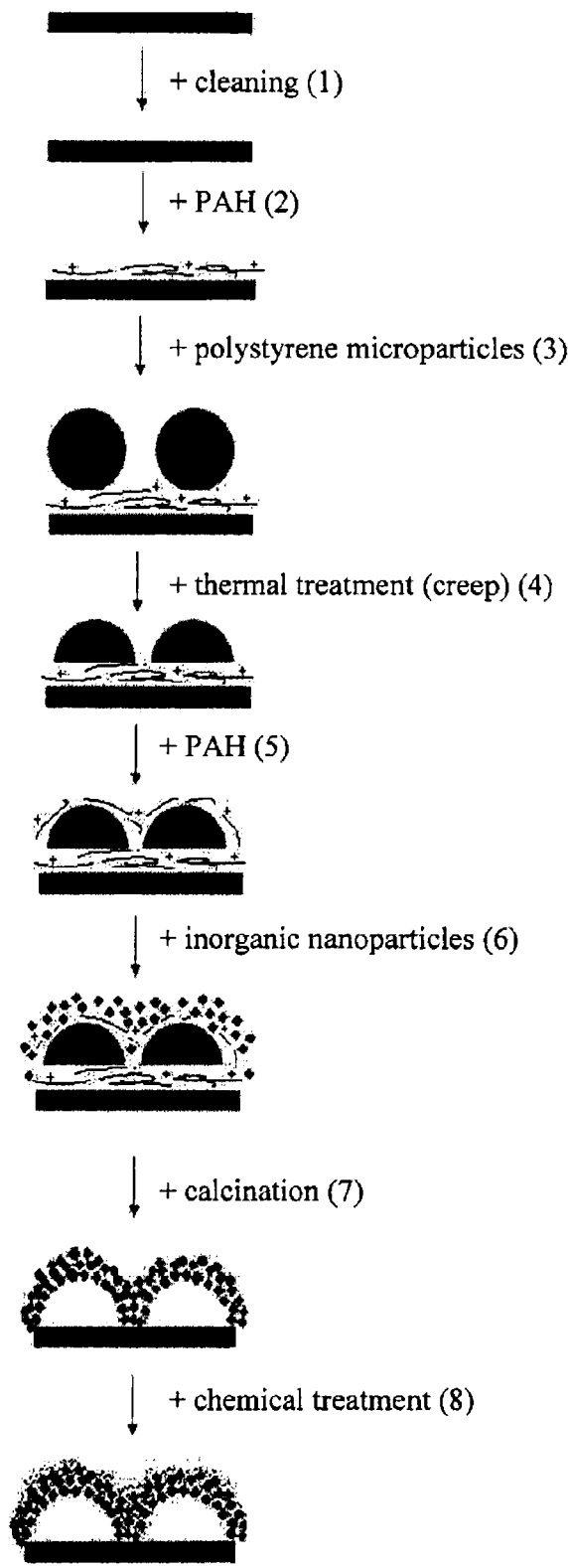

(51) Int. Cl.
*B05D 1/00* (2006.01)
*C03C 17/00* (2006.01)
*G02B 1/11* (2006.01)

(56) References Cited

U.S. PATENT DOCUMENTS

| | | |
|---|---|---|
| 2007/0166513 A1 | 7/2007 | Sheng et al. |
| 2007/0189944 A1* | 8/2007 | Kirkland et al. ........... 423/118.1 |
| 2008/0038458 A1 | 2/2008 | Gemici et al. |
| 2008/0131635 A1* | 6/2008 | Ono et al. .................... 428/35.7 |
| 2009/0297853 A1* | 12/2009 | Kirkland et al. .............. 428/403 |
| 2010/0098902 A1* | 4/2010 | Kotov et al. .................. 428/105 |
| 2011/0073003 A1 | 3/2011 | Gemici et al. |

OTHER PUBLICATIONS

International Search Report Issued Aug. 24, 2011 in PCT/EP11/62197 Filed Jul. 18, 2011.

* cited by examiner

FIG. 10

| Designation | Nature of Deposit/Steps Applied (see Figure 1) | Haze |
|---|---|---|
| Bare glass | - | 0.1 |
| Si_22*1 | 1 layer of Si-NPs | 0.14 |
| Si_22*3 | 3 layers of Si-NPs | 0.33 |
| Si_22*1Mh | 1/2/3/4/5 (1×)/6 (1×)/6a | 1.3 |
| Si_22*1Ms | 1/2/3/5 (1×)/6 (1×)/6a | 2.5 |
| Si_22*3Mh | 1/2/3/4/5 (3×)/6 (3×)/6a | 5.5 |
| Si_22*3Ms | 1/2/3/5 (3×)/6 (3×)/6a | 8 |
| Si_22*3Ms(d+) | 1/2/3 (more significant density of PS particles)/5 (3×)/6 (3×)/6a | 8 |
| Si_22*3Ms1000 | 1/2/3 (PS with diameter of 1000 nm)/5 (3×)/6 (3×)/6a | 15.5 |
| Si_22*3Ms1000(d+) | 1/2/3 (PS with diameter of 1000 nm & more significant density)/5 (3×)/6 (3×)/6a | 22 |

The micro gaps are formed by default from polystyrene (PS) microparticles with a diameter of about 500 nm. Their coverage rate is about 20% by default.

PS = polystyrene; Si-NPs = silica nanoparticle with a diameter of about 20 nm

PROCESS FOR THE PRODUCTION OF A DEPOSIT OF INORGANIC NANOPARTICLES HAVING MICRO GAPS ONTO A LIGHT-TRANSPARENT SUPPORT

CROSS REFERENCE TO RELATED APPLICATION

This application is a 371 of PCT/EP2011/062197, filed on Jul. 18, 2011, and claims priority to Belgium Application No. 2010/0445, filed on Jul. 19, 2010.

BACKGROUND OF THE INVENTION

The invention relates to a process for the production of a deposit of inorganic nanoparticles having micro gaps onto a light-transparent support as well as a deposit that can be obtained by the process.

Within the framework of the invention "deposit of inorganic nanoparticles having micro gaps" is understood to be a deposit of inorganic nanoparticles that have cavities of micrometric size forming "domes", for example, that are possibly interconnected depending on the form of deposit. The size of the nanoparticles typically ranges between 5 and 50 nm. The shell of each base cavity or "dome" is therefore formed from at least one layer of inorganic nanoparticles. Moreover, there can be gaps or spaces between each base nanoparticle, referred to here as "nano gaps".

Patent US 2007/0104922 describes a process for the production of a deposit formed from several layers of inorganic nanoparticles secured to a light-transparent support by means of an organic polyelectrolyte. The deposit can be applied to all the faces of the support provided that it is possible to immerse said deposit in the aqueous preparation solution. It gives the support antireflective properties, but no experimental element is provided to show that the diffusion of the light is affected by the deposit. It also has good wettability properties (superhydrophilicity or, for the formation of a supplementary chemical deposit, superhydrophobicity).

Light transmission values of above 99% for incident light in the visible range (400 to 800 nm) are indicated in this patent application. The optimum performances obtained are 99.7% light transmission (92% for a normal glass) and 0.1% light reflection (8% for a normal glass).

There is an ongoing need in the field of layers on transparent supports to improve the diffusion of light in particular in the visible range as well as improve the antireflective properties of such supports.

BRIEF SUMMARY OF THE INVENTION

The present invention relates to a process for the production of a transparent support covered with a deposit of inorganic nanoparticles, said deposit having micro gaps, comprising the following steps:
(a) application of a solution of polyelectrolyte having ionised functional groups to a transparent support, followed by at least one washing and drying step to form a charged polyelectrolyte deposit on said support;
(b) application of a solution of polymer microparticles having ionised groups with charges opposed to those of the polyelectrolyte deposit to said polyelectrolyte deposit, followed by at least one washing step for the formation of a deposit of charged polymer microparticles on the polyelectrolyte deposit;
(c) covering the deposit of charged polymer microparticles with a solution of polyelectrolyte having ionised functional groups with charges opposed to those of the charged polymer microparticles of step (b), followed by at least one washing and drying step to form a charged polyelectrolyte deposit;
(d) application of a solution of ionised inorganic nanoparticles having surface charges opposed to those of the charges of the polyelectrolyte of step (c) to the charged polyelectrolyte deposit, followed by at least one washing step to form at least one layer of ionised inorganic nanoparticles;
(e) removal of the deposit of polymer microparticles of step (b) and the deposits of polyelectrolyte of steps (a) and (c) to obtain the deposit of inorganic nanoparticles having micro gaps.

DETAILED DESCRIPTION OF THE INVENTION

For implementation of the process it is possible to provide a substrate formed from a transparent support, e.g. of glass, having a coating of inorganic nanoparticles, the structure of the deposit forming at least one homogeneous layer over the entire surface and the coating being such that it has micro gaps of variable diameter, typically ranging between 0.3 and 5 μm. These micro gaps appear after removal of the polymer microparticles and the rate of coverage and distribution of the latter can be satisfactorily adjusted during formation of the deposit. The rate of coverage is defined here as follows: rate of coverage of the particles=((100×number of particles deposited×projected area of a particle on the support)/total area of the surface.

The distribution over the surface of the support of these micro gaps can be isotropic, i.e. an identical distribution in all spatial directions considered on the surface.

On the nanometric scale the deposit of inorganic nanoparticles is inconsistent, i.e. it contains interparticular nano gaps. This deposit can be formed from several layers of nanoparticles ("multilayer" deposit). The increase in the number of layers of the deposit of these nanoparticles can improve the antireflective properties. If the number of layers applied is too high, it can also result in a loss of antireflective properties in the visible range. For example, in the case of a 1.9 mm thick clear float glass covered with silicon oxide nanoparticles with a diameter of 22 nm, the maximum number of layers that can be applied is 10 to 12.

Such a substrate that can be obtained using the process is illustrated in FIG. 1, for example.

Advantageously, the deposit gives the support new optical properties such as an improvement in antireflective properties (decrease in light reflection of 25% to 75% in relation to the reflection on a support of 1.9 mm thick clear float glass without a deposit) and an increase in light diffusion within the range of 1 to 20% of the total light for clear and extra clear glasses of a thickness classically used in the technical field of the invention (1.5 mm-15 mm), whereas a value of 0.1% is measured for a support of 1.9 mm thick clear float glass without a deposit. It also has wettability properties, especially hydrophilicity and/or superhydrophilicity, that are particularly stable over time, preferably between 3 and 15 months, advantageously between 6 and 11 months.

In contrast to the teaching of US 2007/0104922, the existence of gaps of micrometric size in the deposit of the present invention ensures some degree of light diffusion while maintaining the transparency of the glass. By adjusting both the volume and the density of these micro gaps, it is therefore possible to modulate the extent of the diffusion phenomenon sought.

Besides the Raleigh diffusion type phenomena that are not, or only negligibly, affected by the deposits of the present invention, the creation of gaps close in size to that of the wavelengths (or micro gaps) of incident light onto a surface benefit the diffuse reflection of the incident ray of visible light. The significance of the diffusion phenomena caused by a surface can be measured by using an integrating sphere mounted in a spectrophotometer. This type of equipment is also referred to as a hazemeter. By way of example, covering a support of 1.9 mm thick clear float glass with six layers of silicon oxide nanoparticles with a diameter of about 20 nm will only have a slight effect on the light diffusion compared to that of a bare glass (haze of 0.1%). Conversely, the introduction of spherical gaps or micro gaps with an approximate diameter equal to 500 nm and a rate of coverage of around 20% into this deposit will significantly increase the diffusion measured at the hazemeter (haze of 5.5%).

The formation of deposits on a support transparent to visible light in order to obtain antireflective properties over a wavelength range rather than at a single wavelength can be achieved when a refractive index gradient exists over the entire thickness of said deposit (Jeri'Ann Hiller et al., *Nature Materials*, 2002, 1, 59-63). The maximum refractive index values of this gradient must correspond to the refractive indexes of the support of the deposit on one hand and the area on the other. The antireflective properties can be demonstrated on the basis of transmission and reflection spectra recorded using a spectrophotometer. By way of example, the deposit on a glass support of several layers of silicon oxide nanoparticles with a diameter of about 20 nm greatly improves the antireflective properties of this glass. In fact, while a 1.9 mm thick clear float glass reflects up to 8% of the incident visible light, a glass with identical characteristics but covered with six layers of silica nanoparticles with a diameter of 20 nm (without micro gaps) only reflects 0.1% of this same light.

The transparent support is a material that is inorganic or organic in nature, or a combination of both. Its dimensions are only set by the technical restriction applied by the manner in which the deposits are produced: they must be capable of being immersed in the deposit solution. It is transparent, i.e. it allows the largest portion of incident visible light to pass through. The absorption of electromagnetic waves in the visible range (wavelength of about 400 to 800 nm) by the material of the support is therefore low. By way of example, the transparent support can be of glass or a polycarbonate- or poly(methyl methacrylate)-based polymer material. Glass of any type, such as clear, extra clear, coloured or borosilicate soda-lime float glass is the most preferred. Extra clear glass is understood to be a glass having a maximum iron content, expressed in the form of $Fe_2O_3$, of less than 0.4% by weight, in particular less than 0.02% by weight. Clear glass is understood to be a glass having a maximum iron content, in the form of $Fe_2O_3$, ranging from 0.04 to 0.4% by weight. The support can also be charged positively and/or negatively. It is advisable to choose a support that is resistant to the various chemical and/or physical treatments of the invention.

In the sense of the present invention a polyelectrolyte is a polymer in which the repeated chemical pattern is organic or inorganic in nature, or a combination of both. Moreover, the pattern must contain functional groups that are ionised in the conditions of use. The polyelectrolytes can be natural such as DNA, natural and chemically modified such as chitin or cellulose, or synthetic. In the context of the invention, any type of polyelectrolyte is suitable provided that it meets the definitions below.

Weak or strong polyelectrolytes can be defined on the basis of the acid-base properties of the functional group. A cationic polyelectrolyte carries positive ions. As an example, a weak cationic polyelectrolyte can be poly(allylamine hydrochloride) (PAH). An anionic polyelectrolyte carries negative ions. As an example, a strong anionic polyelectrolyte can be polystyrene sulphonate (PSS). Examples of positively or negatively charged usable synthesis polyelectrolytes include polyethyleneimine, poly(allylamine hydrochloride), poly diallyldimethylammonium chloride, polystyrene sulphonate, polyvinyl sulphate and polyacrylic acid. It is preferred if the polyelectrolytes used are polyethyleneimine, poly(allylamine hydrochloride), poly diallyldimethylammonium chloride. In the case of the latter, the molar mass is lower than 100000 $g \cdot mole^{-1}$ or in the range of between 40000 and 500000 $g \cdot mole^{-1}$. An example of inorganic synthesis polyelectrolyte is polysialate, an aluminosilicate-based inorganic polymer.

Examples of positively or negatively charged, natural or natural and chemically modified polyelectrolytes can belong to the series of nucleic acids, proteins and polysaccharides. These are, for example, peptides, glycopeptides, polypeptides, peptidoglycans, glycosaminoglycans, glycolipids, lipopolysaccharides of proteins, glycoproteins, polycarbonates, nucleic acid polymers, nucleotides or polynucleotides, RNA or DNA. A polyelectrolyte of natural origin is preferably poly-L-lysine. It is still further preferred if the polyelectrolyte used is poly(allylamine hydrochloride) or PAH.

In the present invention a polymer microparticle is a particle of polymer material that has ionised groups on its surface typically with positive or negative surface charges, but with opposing sign to those of the polyelectrolyte. Said polymer material is a material that can be deformed or removed by the application of an appropriate temperature.

Within the framework of the invention the charged polymer particles will be referred to as microparticles.

The deformation, i.e. the change in form and/or the change in volume of the particle, is achieved by applying a temperature close to the glass transition temperature of the polymer to the particles. In these conditions the polymer material is more viscous and mobile and must therefore be able to "creep" in order to change the initially present form and volume. Within the framework of the invention this deformation operation is a "creep" operation. Flowed microparticles will be understood to be microparticles subjected to this creep operation.

Removal of the polymer advantageously consists of applying an adequate temperature to pyrolyse the polymer. Within the framework of the invention this operation of removing the microparticles is a calcination operation. Calcined microparticles secured to a transparent support will be understood to be microparticles secured to a transparent support that have been subjected to this calcination operation. This removal can also be achieved by dissolving the polymer using an appropriate organic solvent. Whether by thermal or chemical means, the operation of removing the microparticles will occur after the microparticles have been completely covered with the ionised inorganic nanoparticles.

By way of example, the polymer materials are polystyrene, polymethyl methacrylate or melamine. They are preferably formed from polystyrene. The microparticles can be spherical and monodisperse, i.e. their size distribution is very narrow, or polydisperse, i.e. their size distribution is broad. The diameter of the microparticles is advantageously in the range of between about 300 nm and about 5000 nm, or preferably between 350 and 3000 nm, highly preferred between 40 and 2000 nm or in particular between 450 and 1000 nm.

A mixture of spherical particles of different diameters can also be used with microparticles, wherein the diameter can vary from about 300 nm to about 5000 nm.

Ionised groups of these polymer microparticles carry positive or negative charges. The surface charge can come from the presence of chemical groups on the surface terminated by sulphates, sulphonates, carboxylic acids, amines, hydroxyls or amidines. The ionised groups can also be provided by a mixture of several of these chemical groups on the surface. The nature of the chemical group can be different from that of the polymer material forming the microparticle. The density of the resulting charges of these ionised groups on the surface of the polymer microparticles can vary from a group ionised by 1 $Å^2$ to a group ionised by 10000 $Å^2$.

By way of example, the monodisperse microparticles with a diameter of about 500 nm can be formed from polystyrene having sulphate groups. These particles, which are deposited in an essentially isotropic manner on a support of 1.9 mm thick clear float glass with a rate of coverage of the surface of about 20% and secured by the polyelectrolyte PAH, can then be deformed into approximately hemispherical shapes by applying a temperature of 113° C. (creep) for at least 30 minutes. They can be removed by applying a temperature of at least 450° C. (calcination) for at least 20 minutes. A mixture of microparticles can be a mixture of polystyrene particles charged on the surface by sulphate groups and having different diameters in the range of between about 500 nm and about 5000 nm. Moreover, the polymer material can be identical to or of the same chemical family as the polyelectrolyte.

The ionised inorganic nanoparticles are particles formed by a inorganic material. They have negative or positive charges on their surface. These charges can result from the oxides present on the surface. For example, the silanol groups present on the surface of silicon oxide nanoparticles can be completely or partially dissociated, depending on the pH. The charges may also have been provided by fixture of ionised chemical groups such as sulphate groups, sulphonates, carboxylic acids, amides, amines, hydroxyls or amidines. The inorganic nanoparticles are, for example, spherical and monodisperse with a diameter in the range of between about 5 nm and about 50 nm, preferably between 10 and 40 nm, or more preferred between 15 and 30 nm. They can also be spherical and polydisperse with a diameter in the range of between about 5 nm and about 50 nm. By way of example, the nanoparticles can be nanoparticles of a metal oxide such as $SiO_2$ or $TiO_2$ carrying negative charges provided by surface hydroxyl groups. They can also be formed by surface covered gold nanoparticles charged by citrate anions.

The fixture of said polyelectrolytes, microparticles and nanoparticles to the surface of the support or to an already formed deposit is advantageously achieved by the known "layer by layer" deposition method. The interactions causing fixture are mainly electrostatic in nature (P. Bertrand et al., Macromol. Rapid Commun., 2000, 21, 7, 319-348). It is also possible that other interactions occur during the formation of deposits such as hydrogen bonds, covalent bonds, Van Der Waals bonds etc. The method uses steps of wetting a support in diluted aqueous solutions of positively or negatively charged organic or inorganic polyelectrolytes or molecular structures (organic or inorganic nano- or microparticles, for example) to be secured. During each wetting operation a layer of the molecules or molecular structures is secured to the layer or to the initially present support. This thus reverses the surface charge, which thus becomes available for the deposition of a new layer of molecules or molecular structures with opposed charges. The distinctive feature of this type of deposition is thus to be able to create supramolecular structures as a result of the accumulation of layers of molecules and/or molecular structures ("multilayer" deposits) used in each wetting operation and with opposed charges.

A deposit of a layer of microparticles with a satisfactory distribution is a deposit of microparticles without any three-dimensional aggregates, i.e. the microparticles must not be fixed one on top of the other, but side by side on the surface. Advantageously, the microparticles are secured to the surface and spaced from one another without any contact with spaces of approximately equal dimension over the entire surface. In this case, the distribution is referred to as isotropic. It is nevertheless possible that some microparticles adhere to one another to thus form so-called two-dimensional aggregates. However, the existence of three-dimensional aggregates has been observed in the deposit. A maximum acceptable rate of coverage of the surface with these aggregates is 0.1 to 1%. If a surface is only formed from three-dimensional aggregates consisting of an accumulation of microparticles one on top of the other, then the distribution should not be considered as satisfactory by a person skilled in the art.

The thickness of a layer of microparticles is equal to the diameter of the microparticles used for the deposit.

The rate of coverage of the surface by the deposit of nanoparticles on the deposit of polyelectrolyte can be in the range of between 15 and 90%, preferably between 20 and 70%.

The rate of coverage of the ionised inorganic nanoparticles must be as high as possible in order to completely cover the layer of deposited microparticles and the support not covered by the microparticles. Complete coverage is obtained, for example, when it is no longer possible to observe the surface of the support and the microparticles using a scanning electron microscope (SEM).

A satisfactory coverage of a deposit of ionised inorganic nanoparticles must fit the same characteristics as that of a deposit of microparticles with a satisfactory coverage.

However, what would also be considered a satisfactory coverage is the configuration in which several layers of inorganic nanoparticles are superposed one over the other. Here, a layer is advantageously formed by nanoparticles uniformly secured one beside the other on the support or on an underlying layer with interparticular spaces with dimensions that are as low as possible and are approximately equal over the entire surface. An ideal layer would be formed by a periodic assembly and "close packing" of particles in a compact hexagonal arrangement, for example. In reality, the arrangement is often not periodic and the space between particles cannot be uniform. The presence of two-dimensional aggregates can be possible. If a surface is only formed from three-dimensional aggregates, i.e. an accumulation of nanoparticles one on top of the other, separated from one another with zones of the support not covered, then the distribution should not be considered as satisfactory by a person skilled in the art.

The thickness of a layer is equal to the diameter of the nanoparticles used for the deposit. Moreover, the thickness of a multilayer is equal to the sum of the diameters of the nanoparticles forming each layer. By way of example, wetting (or "application of nanoparticles" to) a surface of 1.9 mm thick clear float glass covered with a layer of polyallylamine polyelectrolyte in a colloidal solution of silica nanoparticles with a diameter of 22 nm (concentration of 0.1% by mass, 8≤pH≤9 and ionic strength of 0.1 M) for 30 minutes results in a deposit with a total thickness of about 50 nm. The surface shows a deposit formed from nanoparticles positioned one beside the other and one on top of the other. This arrangement can be observed over the entire surface. If the steps of applying polyallylamine polyelectrolyte then silica nanoparticles with a diameter of 22 nm and with a typical concentration of 0.1% by mass, 8<pH<9 and ionic strength of 0.1 M, on this same glass covered with inorganic nanoparticles are repeated several times, the thickness of the deposit increases linearly with the number of repetitions. Thus, the thickness of the deposit amounts to about 100 nm after two repetitions, 150 nm after three and 200 nm after 4 repetitions.

In step (a), the formation of the ionised polyelectrolyte deposit in the form of a layer fixed or secured to the surface of the support, is advantageously achieved by at least one step of wetting the transparent support, in particular by total immersion, in generally aqueous and preferably diluted solutions of ionised polyelectrolyte. As indicated above, but without being linked by any theory, the fixture of the polyelectrolyte to the surface of the glass can be achieved by electrostatic interactions, hydrogen bonds, covalent bonds or Van Der Waals bonds. As a result of this, the deposit-support assembly is positively or negatively charged, generally on the surface of the deposit, depending on the case.

The pH of the polyelectrolyte solution is preferably in the range of between 1 and 13, the ionic strength between $10^{-6}$ M and 1 M and the adjusted concentration of the polyelectrolyte between $10^{-6}$ M and 1 M. These parameters are adjusted by the person skilled in the art so that they lead to the formation of a polyelectrolyte layer, in which the properties will allow the fixture of microparticles or ionised inorganic nanoparticles to the surface of the support with a satisfactory coverage rate and distribution. The fixture of the microparticles is in fact made possible by the presence of surface charges on the deposit-support assembly.

Advantageously, in the case of a cationic polyelectrolyte, the pH of the solution is in the range of between 3 and 13, the ionic strength between $10^{-6}$ M and $10^{-1}$ M and the adjusted concentration of the polyelectrolyte between $10^{-6}$ M and $10^{-2}$ M. It is highly advantageous if the pH of the cationic polyelectrolyte solution is in the range of between 9 and 12, in particular between 10 and 11.5, the ionic strength between $10^{-3}$ M and $10^{-2}$ M and the concentration between $10^{-6}$ M and $10^{-4}$ M.

The application of the ionised polyelectrolyte solution is conducted for a period of preferably between 30 seconds and 5 hours, preferably between 1 minute and 3 hours, in particular between 30 minutes and 2 hours. However, this period must be sufficient for the deposited and formed polyelectrolyte layer to permit a satisfactory fixture (rate of coverage and distribution) of the layer of microparticles on the deposit of polyelectrolyte. Preferably, in the case where a layer of poly-allylamine polyelectrolyte (concentration $10^{-5}$ M, pH=11, ionic strength $10^{-2}$ M) is deposited onto a 1.9 mm thick clear float glass to secure polystyrene microparticles or silica nanoparticles, the wetting period is about 30 minutes.

After this wetting operation, it is necessary to conduct the washing and drying of the polyelectrolyte deposit.

The conditions of preparation of these solutions and also of washing and drying between two successive wetting steps influence the manner in which the ionised polyelectrolyte will be secured to the support. The manner in which said ionised polyelectrolyte is secured will have an influence on the distribution of the charged polymer particles secured by means of the ionised functional groups of the polyelectrolyte. By way of example, if the intention is to deposit charged particles of polystyrene, in which the negative surface charge is assured by sulphate groups and the diameter of the particles is about 500 nm, on a surface of 1.9 mm thick clear float glass and with isotropic distribution, a step of washing and drying the secured PAH layer must be included at the end of the fixing step of the PAH polyelectrolyte on the glass support.

The washing step is preferably conducted in ultra-pure water, wherein the volume used is advantageously at least 12 times the volume of ionised polyelectrolyte solution initially necessary to cover the entire transparent support. Therefore, washing generally consists of a succession of at least 12 operations of adding ultra-pure water and recovering the washing water.

The drying step is preferably conducted in nitrogen until the disappearance of the washing water residues is observed.

The process of the invention can also include, before step (a), a step of cleaning the transparent support in order to remove surface contaminants therefrom and to provide a reproducible surface structure for each support. This is generally achieved by a 3:1 v/v mixture of sulphuric acid/oxygenated water, although any classic method can be used provided that it does not degrade the support.

The method of depositing microparticles onto the deposit of polyelectrolyte secured to the support (step (b)) is generally performed by wetting the support in solutions of microparticles that are preferably aqueous and generally diluted, and usually colloidal.

The pH of the solution of microparticles is preferably in the range of between 1 and 13, the ionic strength between $10^{-6}$ and 1 M and the adjusted concentration between 0.001% by weight and 50% by weight, preferably between 0.01% and 40% by weight, more preferred from 0.1% to 30% by weight, in particular between 1% and 20% by weight. However, these parameters are adjusted by the person skilled in the art so that they result in the formation of a layer of microparticles with properties that would allow the fixture of ionised inorganic nanoparticles to the surface of the deposit of microparticles with a satisfactory rate of coverage and distribution.

The application of the solution of polymer particles having ionised groups is preferably conducted for a period of between 10 minutes and 5 hours, preferably between 30 minutes and 3 hours, and in particular between 1 hour and 3 hours. However, this period must be sufficient for the polymer layer to be secured satisfactorily, i.e. with satisfactory rates of coverage and distribution. Preferably, in the case where a layer of poly(allylamine hydrochloride) (concentration $10^{-5}$ M/L, pH=11, ionic strength $10^{-2}$ M) is deposited onto the support, the deposit of polystyrene microparticles is conducted in 2 hours with a colloidal solution of polystyrene microparticles comprising ionised sulphate groups with the following characteristics $5 \leq pH \leq 7$, concentration by weight of microparticles of 0.1%.

The process of the invention comprises a step (c) of covering the deposit of charged polymer particles (step (b)) with a solution of polyelectrolyte, which comprises ionised functional groups with charges opposed to those of the charged polymer particles, followed by at least one step of washing and drying to form a charged polyelectrolyte deposit.

This step is preferably performed by wetting the supports prepared after step (b) and covered with microparticles in a solution of polyelectrolyte, wherein the charges of the ions are opposed to those present on the surface on the microparticles of the support. This results in the fixture of a layer of polyelectrolyte on the microparticles.

The characteristics of the polyelectrolyte solution and the period of deposition of polyelectrolyte to be applied to the microparticles are advantageously the same as those for the formation of a layer of polyelectrolyte on the support in step (a). The washing and drying operations to be conducted must also be of the same type as those described after the formation of a layer of polyelectrolyte on the support in step (a).

Step (d) of the process according to the invention consists of the application of a solution of ionised inorganic nanoparticles having surface charges opposed to those of the charges of the polyelectrolyte of step (c) to the charged polyelectrolyte deposit, followed by at least one washing step to form at least one layer of ionised inorganic nanoparticles.

It is preferably performed by wetting supports in preferably aqueous and generally diluted solutions of nanoparticles that are usually colloidal.

The pH of the solution of ionised inorganic nanoparticles lies in the range of between 1 and 13, the ionic strength between $10^{-6}$ and 1 M and the adjusted concentration between 0.01% by weight and 50% by weight. These parameters are adjusted by the person skilled in the art so that they result in the formation of a layer of nanoparticles with a satisfactory rate of coverage and distribution on the surface of the support.

The application of the solution of ionised inorganic particles is preferably conducted for a period of between 30 seconds and 5 hours, preferably between 1 minute and 3 hours, in particular between 30 minutes and 2 hours. However, this period must be sufficient for the layer of nanoparticles to be secured satisfactorily, i.e. with satisfactory rates of coverage and distribution. It is possible that at the end of this step the deposit is formed by several layers of inorganic nanoparticles, wherein the meaning of the term "layer of inorganic nanoparticles" is understood to be that defined in the context of the invention. Preferably, in the case where the layer of inorganic nanoparticles to be deposited on the layer of polyallylamine secured to the polystyrene microparticles (charged by sulphate groups on the surface) is a layer of silica nanoparticles with a diameter of 22 nm, the deposit will be conducted in 30 minutes, with a colloidal solution of silica nanoparticles with the following characteristics $8 \leq pH \leq 9$, concentration by mass of the nanoparticles of 0.1% and ionic strength 0.1 M.

Since the removal of the polymer material forming the microparticles must be conducted after the microparticles have been completely covered by the inorganic nanoparticles, it can be advantageous to provide at least one additional step (step (d')) of applying one or more additional layers of inorganic nanoparticles onto at least one layer of ionised nanoparticles obtained according to step (d).

In this case, before the deposition of a new layer of ionised inorganic nanoparticles (step (d')) on a layer of ionised nanoparticles already deposited (previous layer) (step (d)), the process includes a step of covering said previous layer with a layer of polyelectrolyte having ionised functional groups, the charges of which are opposed to those of the ionised nanoparticles.

The wetting of the prepared supports covered with the previous layer in a solution of polyelectrolyte, wherein the charges of the ions are opposed to those present on the surface on the ionised nanoparticles of the previous layer of nanoparticles, preferably results in a layer of polyelectrolyte being secured to the previous layer of nanoparticles.

In the present document the number of step (d) and steps (d') conducted is referred to as n.

The inventors have demonstrated that an increase in the number of layers of silica nanoparticles with a diameter of 22 nm on a 1.9 mm thick clear float glass with a rate of coverage of the micro gaps of about 25% improves the antireflective properties in particular in the visible range in such a way that the light transmission is within the range given above. Moreover, an increase in the light diffusion in the range given above is also evident. However, the maximum number of layers is generally between 10 and 12.

The characteristics of the polyelectrolyte solution and the time taken to deposit polyelectrolyte to be applied to the microparticles are the same as those for the formation of a layer of polyelectrolyte on the support in steps (a) and/or (c).

The method of obtaining the new layer of ionised inorganic nanoparticles on the previous one covered with polyelectrolyte advantageously uses a wetting operation of the supports in preferably aqueous and generally diluted, usually colloidal solutions of nanoparticles.

The characteristics of the solution of ionised inorganic nanoparticles and the time taken for the deposition of these are advantageously identical to those for the formation of a layer of inorganic nanoparticles on the support covered in step (d).

The conditions of preparation of these solutions of nanoparticles as well as the washing and drying operations between two successive wetting operations influence the manner in which the microparticles and/or ionised inorganic nanoparticles will be secured.

The washing step after a deposit of microparticles and/or ionised inorganic nanoparticles is preferably conducted using ultra-pure water, wherein the volume used is advantageously at least 6 times the volume of ionised polyelectrolyte solution initially necessary to cover the entire transparent support, then with a solvent, the surface tension of which, at 20° C., is at least about 3 times weaker than that of water, such as an alcohol, preferably isopropanol, wherein the volume used is advantageously at least 6 times the volume defined above. The objective of using a solvent with a low surface tension is to limit the closer arrangement of the initially spaced microparticles or nanoparticles deposited on the surface of the support. This phenomenon, partially due to the formation of aggregates, is observed during the drying operation and occurs as a result of the surface tension of the thin film of solvent trapped between the particles.

Therefore, the washing advantageously consists of a succession of at least 6 operations of adding ultra-pure water and at least 6 operations of adding a solvent of low surface tension and recovering the washing residues.

A drying step can also be provided after the washing step of step (d), preferably conducted in nitrogen until the disappearance of the washing water residues is observed.

As a variant, after step (b) of depositing polymer microparticles and before step (c), it is also possible to discard the step of washing in solvent with a low surface tension and replace it with washing operations in water if a layer of ionised inorganic nanoparticles has been deposited on the zones of the support that have not yet been covered with the microparticles.

In the case where wetting in the solution of ionised inorganic nanoparticles is sufficient to deposit several layers in a single action, the zones of the support not covered with the microparticles are then covered with several layers of inorganic nanoparticles. The fixture of the nanoparticles is possible in that the zones of the support not covered with the microparticles remain covered by a deposit of charged polyelectrolyte. Depending on the relative diameter of the nanoparticles used compared to that of the microparticles, but also depending on the rate of coverage of the surface with this deposit of nanoparticles, the layer or layers of nanoparticles deposited on the support between the microparticles will prevent them from coming closer. The person skilled in the art will choose the appropriate diameter of the nanoparticles in order to observe the restriction of the microparticles coming closer, i.e. by means of routine tests. The diameter of the nanoparticles used can possibly be different from that or those used in steps (d) and (d'). The use of this or these layers of nanoparticles to prevent the microparticles from coming closer must not, however, impair the optical properties (light diffusion and antireflective properties) provided by the deposit.

The deposit of inorganic nanoparticles on the surface of the support not covered with the microparticles is preferably achieved by wetting the supports in preferably aqueous and generally diluted solutions of nanoparticles that are usually colloidal. The characteristics of the colloidal solutions are advantageously identical to those for the formation of a layer of ionised inorganic nanoparticles on the support covered with microparticles (step (d)).

In this case, it is possible to apply step (c) immediately after the step of washing with water during step (b). Washing then preferably consists of a succession of at least 12 operations of adding ultra-pure water and recovering the washing residues. Immediately after the last washing operation, the modified support can be wetted in the solution of polyelectrolyte used for the subsequent step (c). Therefore, it is not necessary to dry the surfaces after washing them.

In a variant, the process can advantageously include a step (b') between steps (b) and (c) of applying a sufficient temperature to cause the microparticles to creep. A temperature is applied that is close to that glass transition temperature of the polymer material forming the microparticles for a period long enough to obtain the desired shape. Advantageously, in the case where spherical polystyrene microparticles charged on the surface by sulphate ionised groups and with a diameter of 500 nm are secured to the glass via a polyallylamine layer, the application of a temperature of 113° C. for 30 minutes will transform the spheres into hemispheres with a base diameter of about 500 nm and a height of 400 nm.

The surface density of the microparticles secured to the transparent support via an ionised polyelectrolyte can be readily controlled by increasing the mass concentration of microparticles of the deposit solution defined above. By way of example, the fixture of polystyrene particles with negative surface charges as a result of sulphate groups and with a diameter of about 500 nm from a 0.1% by weight solution to a 1.9 mm thick clear float glass leads to surface densities of microparticles of about 25%. If a mass concentration of solution of 5% is used, the surface densities of polystyrene particles obtained are in the order of 50%. This increase in the density of the microparticles, after the formation of micro gaps, benefits the increase in light diffusion of the support covered with such a deposit.

According to the present invention, deposits of microparticles on the deposit of polyelectrolyte secured to the support (step (b)) then the deposit of the ionised inorganic nanoparticles on the microparticles covered previously by a polyelectrolyte layer (steps (c) and (d)) are advantageously obtained using the "layer by layer" deposition method mentioned above. Since the interactions are essentially electrostatic in nature, the charges present in the polyelectrolyte must be opposed to those of the microparticles and the ionised inorganic nanoparticles.

Without being linked by any theory, however, it can be explained that the deposits of ionised polyelectrolyte on the transparent support, on the microparticles or the nanoparticles, of microparticles on the deposit of ionised polyelectrolyte and then of ionised inorganic nanoparticles on the deposit of microparticles covered with polyelectrolyte or of nanoparticles covered with polyelectrolyte generate on each deposit an inversion of the charges of the surface on which they are secured, i.e. that the total number of charges of the ionised component to be deposited is higher than that of the charges of the ionised deposit initially present, wherein said charges are of opposite sign, which allows the electrostatic interactions. At the location where the fixture occurs, there results a balance of total surface charges in favour of those of the compound to be deposited.

After step (d), and possibly step (d'), the process includes a step (e) of removing the deposit of polymer particles and deposits of polyelectrolyte of steps (a) and (c) to obtain the deposit of inorganic nanoparticles containing micro gaps.

Step (e) is advantageously conducted by heating the support covered with the layers defined above. The heating should be such as takes place during calcination. This operation is intended for the removal of the polymer of the microparticles and the polyelectrolyte. After this treatment the polymer of the microparticles and the polyelectrolyte present at the start become undetectable in a surface analysis using X-ray photoelectron spectroscopy (XPS), for example. The applied temperature can be easily determined by a person skilled in the art, but must not degrade the support. Said treatment is referred to as calcination treatment and is applied after the microparticles have been completely covered with the inorganic nanoparticles. A complete coverage is obtained, for example, when it is no longer possible to observe the surface of the support and the microparticles using a scanning electron microscope (SEM). By way of example, polystyrene microparticles secured to a surface of 1.9 mm thick clear float glass and covered with six layers of silica nanoparticles can be removed by applying a temperature of 450° C. to 600° C. for at least 20 minutes.

Prior to the removal of the microparticles and the polyelectrolyte by thermal treatment or heating, between steps (d), possibly (d'), and step (e), the modified supports can be immersed in a solution of a salt, typically with a concentration of 0.1 M, for about 30 to 120 minutes. The washing operations with water after the last application of nanoparticles, e.g. of silica mentioned above, can also be conducted using a solution of a salt if the intention is to subject the samples to a calcination operation. Moreover, the sample can be left in a solution of this salt after being fully dried following the formation of the deposit of ionised inorganic nanoparticles. All these treatments benefit, and to more significant degrees if a salt is used, the bonding of the nanoparticles with one another and/or with the support as a result of sintering. The salt is typically NaCl.

In a variant, the microparticules covered with the inorganic nanoparticles as well as the deposit of polyelectrolyte can be removed by using a solvent capable of dissolving these polymers. By way of example, these are aromatic hydrocarbons such as benzene, toluene, xylene and ethylbenzene, solvents based on aliphatic chlorinated hydrocarbons such as dichloromethane, chloroform or carbon tetrachloride. Other solvents can also be used such as pyridine, dioxane, dimethylformamide, cyclohexanone, tetrahydrofuran, ethyl or butyl acetate and derivative solvents of cyclohexane. If this same surface of 1.9 mm thick clear float glass modified by polystyrene microparticles is left in tetrahydrofuran or chloroform for at least one hour, the polystyrene will also be removed. It is possible to combine the use of a solvent of the microparticles with the application of ultrasound to accelerate the removal of the polymer. Whichever solvent is used, it must not, however, degrade the support.

The size of the micro gaps can be varied in several ways. For this, the process can advantageously include a step (b') between steps (b) and (c) for subjecting the microparticles to creep, as described above. This consists of a thermal treatment capable of deforming and changing the volume of the microparticles. This term is used because the polymer forming the microparticles must be more viscous and mobile and must therefore be able to "creep" under the effect of application of a temperature close to its glass transition temperature in order to modify the shape and volume initially present. This treatment is performed before the inorganic nanoparticles are deposited using the "layer by layer" technique according to steps (d) or (d').

After the desired shape and volume have been obtained, the particles subjected to creep can then be covered completely, for example, by several layers of ionised inorganic nanoparticles. It is possible to apply this treatment whatever the diameter of the secured microparticles, i.e. to a mixture of secured microparticles with different diameters. In the case where the diameters of the microparticles used lie in the range of 300 nm to about 5000 nm, the microparticles subjected to creep will be transformed into hemispheres with a base diameter in the range of between 300 and 5000 nm and a height of between 250 and 4000 nm. By way of example, it is possible to creep spherical polystyrene particles with a diameter of 500 nm that are negatively charged at the surface by sulphate groups and that are secured to a support of 1.9 mm thick clear float glass by applying a temperature of 113° C. for 30 minutes. During this treatment the polystyrene particles with an initially approximately spherical shape are transformed into an approximately hemispherical shape. The complete coverage with several layers of silicon oxide, $SiO_2$, nanoparticles with a diameter of 22 nm, then the removal of the polymer microparticles results in hemispherical void structures, the shell of which is formed by silica nanoparticles. The base diameter of these hemispheres is approximately 500 nm measured by a scanning electron microscope or SEM and the height is approximately 400 nm measured by atomic force microscopy or AFM.

In a variant, it is also possible to use microparticles of different diameters from about 300 nm to about 5000 nm or preferably between 350 and 3000 nm, more preferred between 400 and 2000 nm or in particular between 450 and 1000 nm. For example, the fixture of spherical particles of polystyrene that are negatively charged on the surface, are 500 nm in diameter and are secured to a support of 1.9 mm thick clear float glass with an isotropic distribution and covered with several layers of silica nanoparticles and then removed results in spherical micro gaps approximately 500 nm in diameter (measured by SEM). If charged polymer particles with a diameter equal to or greater than 1000 nm are used, the micro gaps ultimately formed will have a diameter of about 1000 nm (measured by SEM).

The deposits performed according to the present invention comprise structures of both micrometric size that envelop the micro gaps and of nanometric size around the nano gaps. This structure on two size scales that can be distributed isotropically over the support is similar to the well known structure of superhydrophobic lotus leaves (Neinhuis C., Barthlott W., *Ann. Bot.* 1997, 79, 677). These leaves actually have a roughness on two scales combined with a surface chemistry that is favourable to hydrophobicity. A hydrophilic material is a material that has an affinity with water. It is easily wetted with water. Conversely, a hydrophobic material is a material that has a low affinity to water. It has a poor wettability. Measurement of the water contact angle of a material using the sessile drop method enables the degree of hydrophilicity or hydrophobicity of this material to be identified. When a material is superhydrophobic, it provides very substantial contact angles (150° or more). In the case of a superhydrophilic material, the material is covered with a film of water almost instantaneously and the contact angle is then very small (5° or less). As has been demonstrated by Wenzel and Cassie, the creation of a structure on two scales combined with a surface chemistry favourable to hydrophilicity by nature promotes superhydrophilicity (Wenzel R. N. J., *Phys. Colloid. Chem.* 1949, 53, 1466; Wenzel R. N. J., *Ind. Eng. Chem.* 1936, 28, 988; Cassie A. B. D., Baxter S., *Trans. Faraday Soc.,* 1944, 40, 546). The superhydrophobic properties of surfaces can be useful, for example, to form self-cleaning and/or water-resistant surfaces. The superhydrophilic properties of surfaces can be used advantageously to eliminate the condensation of water in the form of droplets on such surfaces. The deposits of the present invention have a highly pronounced hydrophilic character, i.e. a superhydrophilic character. The durability over time of this character is particularly good and lies in the order of at least several months, typically between 3 and 15 months, preferably between 6 and 11 months. By way of example, a glass surface covered with two layers of silica nanoparticles and including hemispherical micro gaps with an isotropic distribution have, just after production, an unmeasurable water contact angle of less than 10°. The drop of water used for the measurement forms a film of water on the surface in a period of less than a second. Fifteen months after production of this deposit, this same surface kept in contact with the ambient air in darkness in a cupboard still has an unmeasurable contact angle of less than 10°. After an equal holding period in similar conditions, a glass support covered with a layer of silica nanoparticles with a diameter of 22 nm (initial contact angle <10°) has a contact angle of about 25°.

Coverage of the deposits of the present invention with chemical compounds having hydrophobic functionalities enables a highly hydrophobic, i.e. superhydrophobic, character to be imparted to the deposits of the present invention. The compounds in question can be surface polymerisable derivative molecules of silicon and have hydrophobic functionalities such as aliphatic hydrocarbon or fluorocarbon chains. By way of example, the same glass surface as modified above and covered with a film of tridecafluoro-1,1,2,2-tetrahydrooctyltrichlorosilane applied in liquid phase can have a water contact angle of 131°.

Depending on the implementations of the invention, the process can include a step (f) performed after step (e) of strengthening the deposit of inorganic nanoparticles with micro gaps.

Different methods, other than or complementary to calcination, can be used.

It is also possible to use a combination of several of these. In fact, in addition to removing the charged polymer particles, the calcination can strengthen the bond between the ionised inorganic nanoparticles with each other or with the support. For example, it is also possible to use a chemical treatment utilising a molecular, macromolecular binder or a silicon- or zirconium-based polymer to strengthen the deposits of ionised inorganic nanoparticles.

More specifically, the chemical treatment aiming at simply strengthening the surface of the inorganic nanoparticles can be conducted using derivative molecules of silicon or zirconium. It is preferably applied after the calcination. These molecules are dissolved in an appropriate solvent such as anhydrous toluene, anhydrous tetrahydrofuran, an anhydrous hydrocarbon solvent, in an anhydrous alcohol or water. The solvent can also be formed by a mixture of these different solvents in the case where the chosen solvents are miscible. If water is used and the silane to be dissolved is poorly soluble in water, it may be necessary to add a non-ionic surfactant to form an emulsion. Acetic acid can also be added to the water to modify the pH.

Said derivative molecules of silicon or zirconium polymerise on the surface of the ionised inorganic nanoparticles as soon as the modified surfaces are immersed in said solvent for the time necessary to form at least one monolayer. Typically, the immersion lasts between 1 and 24 h with a concentration by weight of derivative molecules of silicon or zirconium in the range of between 0.1 and 50%, possibly with heating and/or stirring of the solution. The application of said chemical treatment can also be conducted in the vapour phase. The polymerisation generates covalent bridges between the ionised inorganic nanoparticles. Typically, the derivative molecule of silicon used is $SiCl_4$, which with at least 0.1% by weight is placed in solution in anhydrous toluene. Prior to any application of the chemical treatment and to increase the quantity of the group of silanols present on the surface necessary for polymerisation, the surfaces of the transparent support covered with ionised inorganic nanoparticles can be subjected, for at least 15 minutes, either to a plasma of oxygen and nitrogen formed by UV irradiation of oxygen or to an immersion in a piranha mixture (3:1 $H_2SO_4/H_2O_2$).

The chemical treatment can be applied to strengthen the deposits of inorganic nanoparticles and at the same time render them functional. Organic derivative molecules of silicon or zirconium can be used in this case. This treatment is then preferably applied after calcination. These molecules are dissolved in an appropriate solvent such as anhydrous toluene, anhydrous tetrahydrofuran, an anhydrous hydrocarbon solvent, in an anhydrous alcohol or water. The solvent can also be formed by a mixture of these different solvents in the case where the chosen solvents are miscible. If water is used and the silane to be dissolved is poorly soluble in water, it may be necessary to add a non-ionic surfactant to form an emulsion. Acetic acid can also be added to the water to modify the pH.

Said molecules polymerise on the surface of the ionised inorganic nanoparticles as soon as the modified surfaces are immersed in said solvent for the time necessary to form at least one monolayer. Typically, the immersion lasts between 1 and 24 h with a concentration by weight of the molecules in the range of between 0.1 and 50%, possibly with heating and/or stirring of the solution. The application of said chemical treatment can also be conducted in the vapour phase. The polymerisation generates covalent bridges between the ionised inorganic nanoparticles.

Typically, the derivative molecule of silicon used can be $(R)_{4-n}SiCl_n$ or $(R')_{4-n}Si(OR'')_n$, where n is equal to 1, 2 or 3, where R and R' independently represent groups chosen on the basis of the functionalities intended for the nanostructured surfaces. If the intention is to obtain hydrophobic properties, R and R' can then be chosen in such a manner that the molecules $(R)_{4-n}SiCl_n$ or $(R')_{4-n}Si(OR'')_n$ are chosen in the group formed by the derivatives of methyl silanes such as methyltrichlorosilane, methyltris(methoxyethoxy)silane or trimethylsiloxy trichlorosilane, linear alkyl silanes such as pentyltrichlorosilane or octadecyl-triethoxysilane, or branched alkyl silanes such as isobutyltrichlorosilane or cyclohexyltrimethoxysilane, aromatic silanes such as benzyltrichlorosilane, phenethyl trimethoxysilane or p-tolyltrichlorosilane, fluorinated silanes such as nonafluorohexyl trichlorosilane, (3,3,3-trifluoropropyl) trichlorosilane or (3,3,3-trifluoropropyl) trimethoxysilane, and dialkyl silanes such as diethyldichlorosilane, diethyldiethoxysilane or t-butylisopropyldimethoxysilane.

To obtain anti-fouling functionalities, in particular antibacterial properties and protein adsorption resistance, R and R' can include polyethylene glycol groups, for example. R'' is preferably an alkyl group comprising 1 to 4 carbon atoms. For example, these molecules are diluted to at least 0.1% by mass in anhydrous toluene. Prior to each application of the chemical treatment and to increase the necessary quantity of silanol groups present on the surface for polymerisation, the surfaces of the transparent support covered with ionised inorganic nanoparticles can be subjected, for at least 15 minutes, either to a plasma of oxygen and nitrogen formed by UV irradiation of oxygen or to an immersion in a piranha mixture (3:1 $H_2SO_4/H_2O_2$). It is also possible to additionally add a silicon-based agent to enhance cross-linkage (such as $SiCl_4$).

Other methods for strengthening the deposits can be implemented such as increasing the number of layers of inorganic nanoparticles, calcination after contact of the deposits with inorganic salts for longer or shorter periods, use of an autoclave treatment with or without contact with inorganic salts for longer or shorter periods.

The invention also relates to a substrate having a transparent support with a deposit layer of inorganic nanoparticles having micro gaps that can be formed by conducting the process of the invention described above.

Other characteristics of this substrate are those already advantageously described above. In particular, the micro gaps typically have diameters in the range of between 0.3 and 0.5 µm. Advantageously, the micro gaps have a hemispherical shape with a base diameter of between 300 and 5000 nm and a height of between 250 and 4000 nm.

BRIEF DESCRIPTON OF THE DRAWINGS

The following examples illustrate the invention without restricting its scope and include the following figures.

FIG. 1: is an overview chart of the formation steps of the deposits of the present invention according to a preferred embodiment of the invention.

Figure 2:

FIG. 2: is an SEM (scanning electron microscope) image of the surfaces obtained after step (3) (see FIG. 1) of securing polystyrene particles with a diameter of 500 nm. The insert shows that glass covered with this deposit is translucent.

Figure 3A:
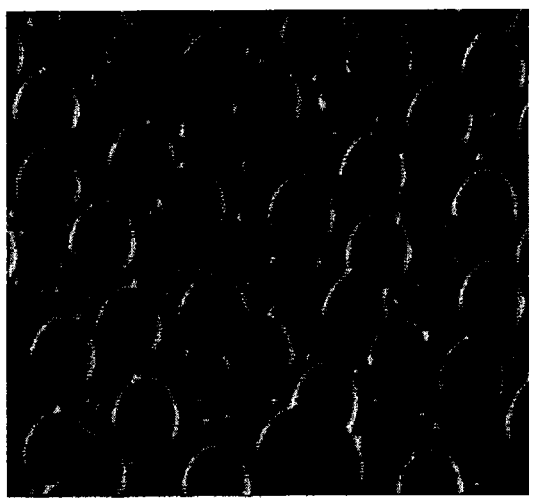
Figure 3B:
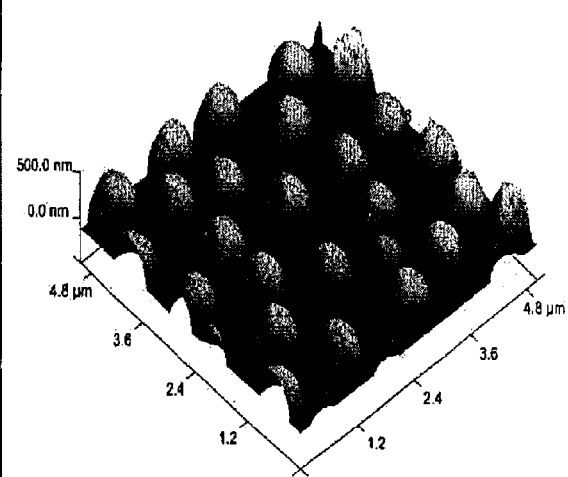

FIGS. 3A and 3B: show images of the surfaces obtained after thermal treatment for deformation of the polystyrene particles with a diameter of 500 nm during step (4) (see FIG. 1): A image recorded by SEM; B image recorded by AFM (atomic force microscope).

Figure 4:
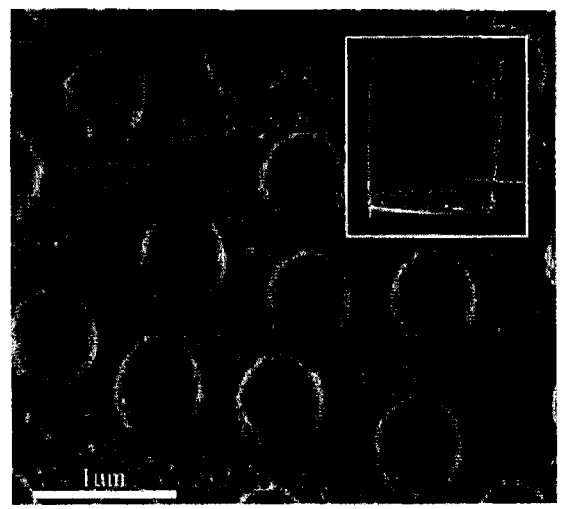

FIG. 4: is an SEM image of the surfaces obtained after step (7) of calcination (see FIG. 1) of the surfaces with hemispherical micro gaps covered with silica nanoparticles with a diameter of 22 nm (n=3). The insert shows the transparency of the glass covered with this deposit.

Figure 5A:
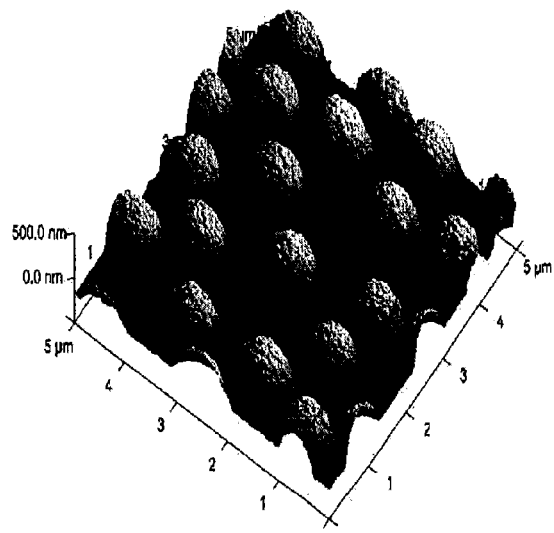
Figure 5B:
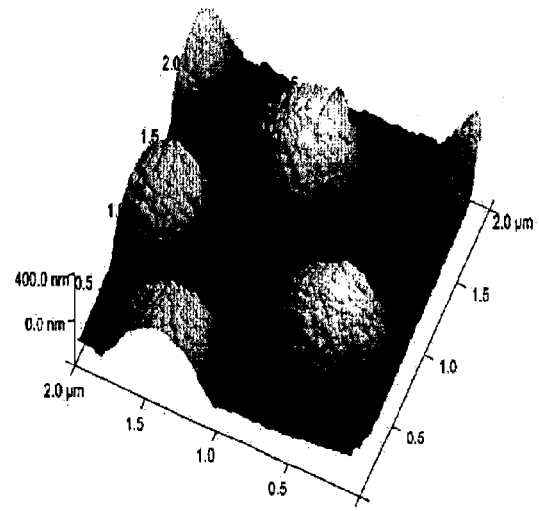

FIGS. 5A and 5B: show two views of an AFM image of the surfaces obtained after step (7) of calcination (see FIG. 1) of the surfaces with hemispherical micro gaps covered with silica nanoparticles with a diameter of 22 nm (n=3).

Figure 6A:
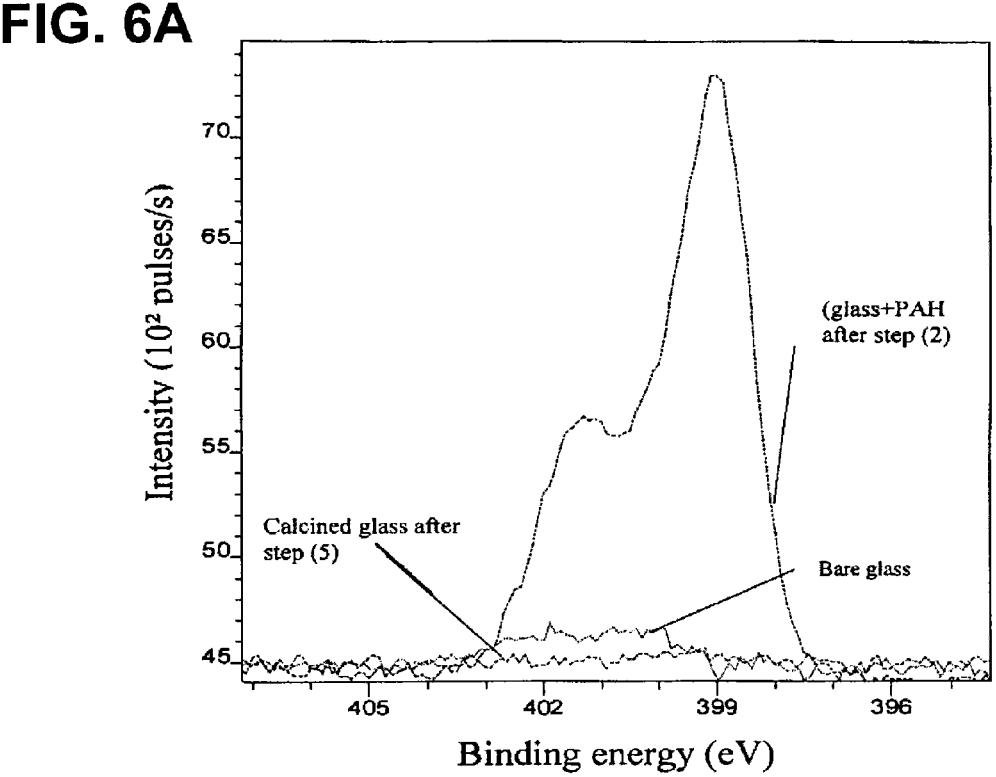
Figure 6B:
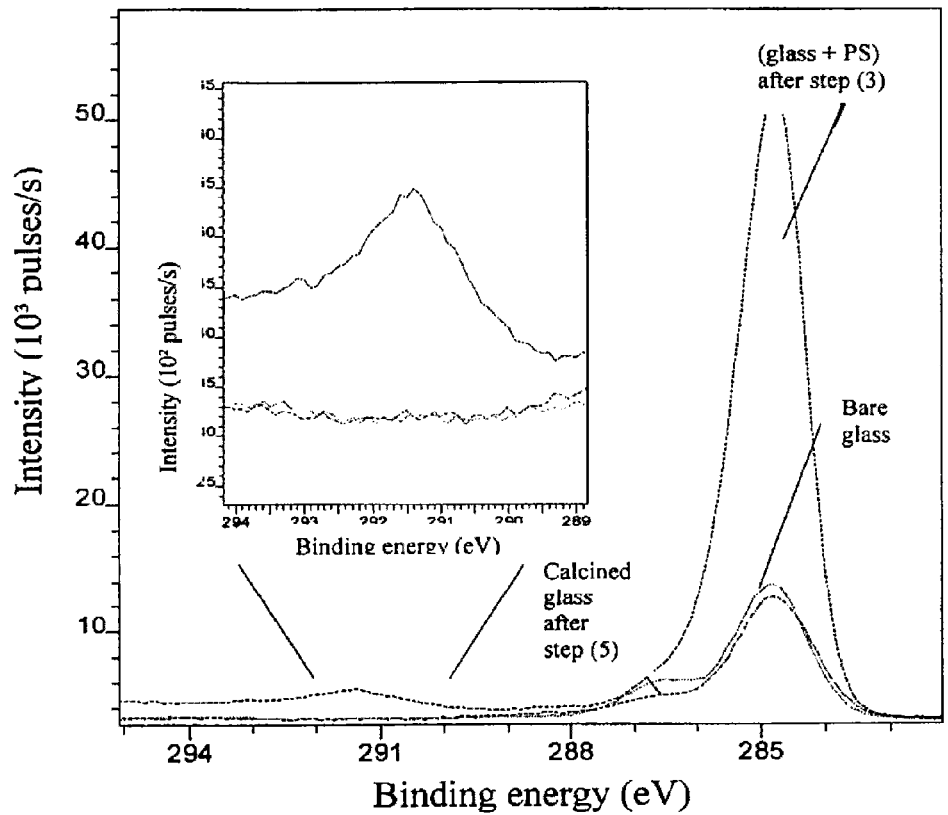

FIGS. 6A and 6B: show an XPS spectrum recorded for different surfaces around the binding energy of orbital 1 s of nitrogen (A); and an XPS spectrum recorded for different surfaces around the binding energy of orbital 1 s of carbon (B). The inserts enlarges the zone around 291.5 eV where a characteristic peak ("shake up") of the polystyrene is visible.

Figure 7A:
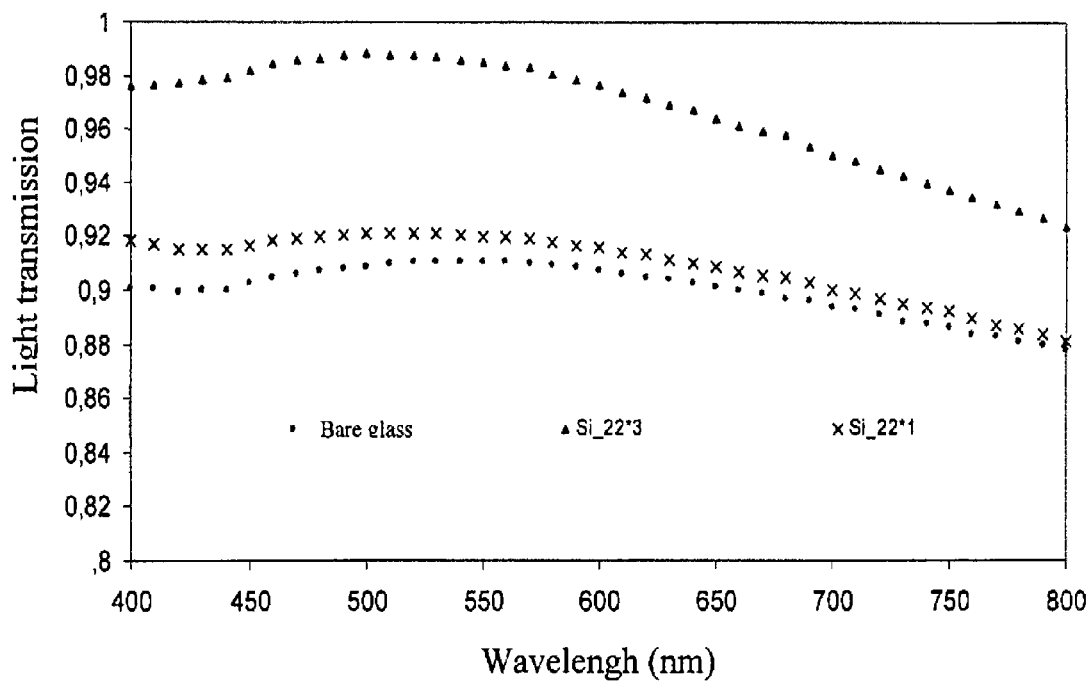
Figure 7B:
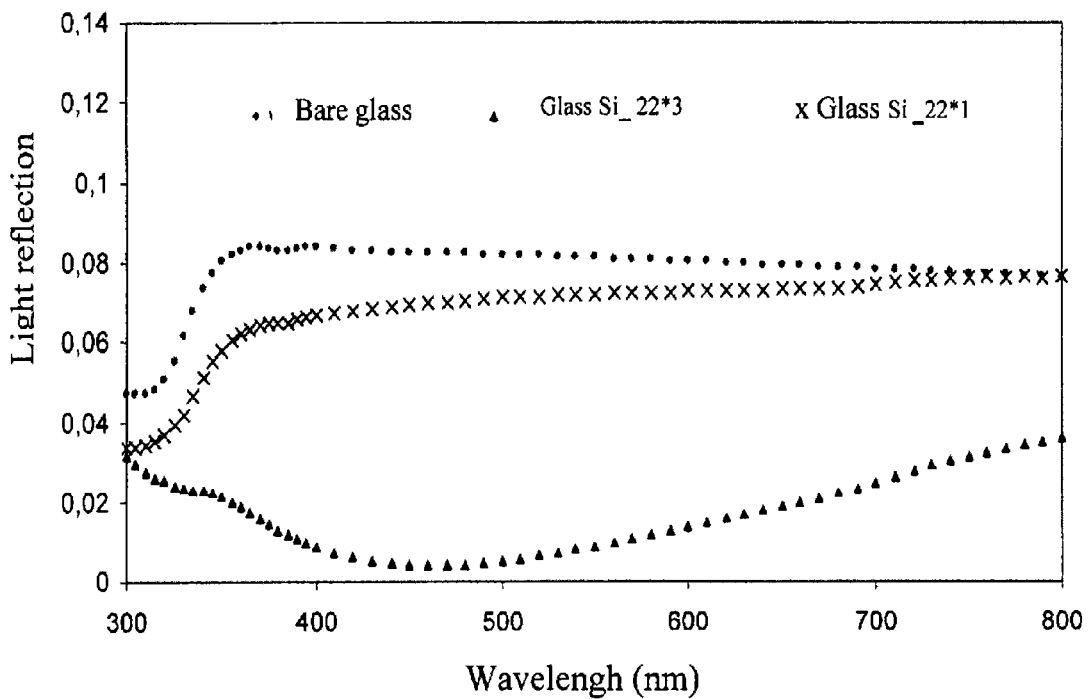

FIGS. 7A and 7B: show the transmission spectra (A) of the light reflection (B) recorded in the visible range for the surfaces covered solely with silica nanoparticles with a diameter of 22 nm (n=1 and n=3) compared to the cleaned glass support without deposit. See FIG. 10 for used terminology.

Figure 8:
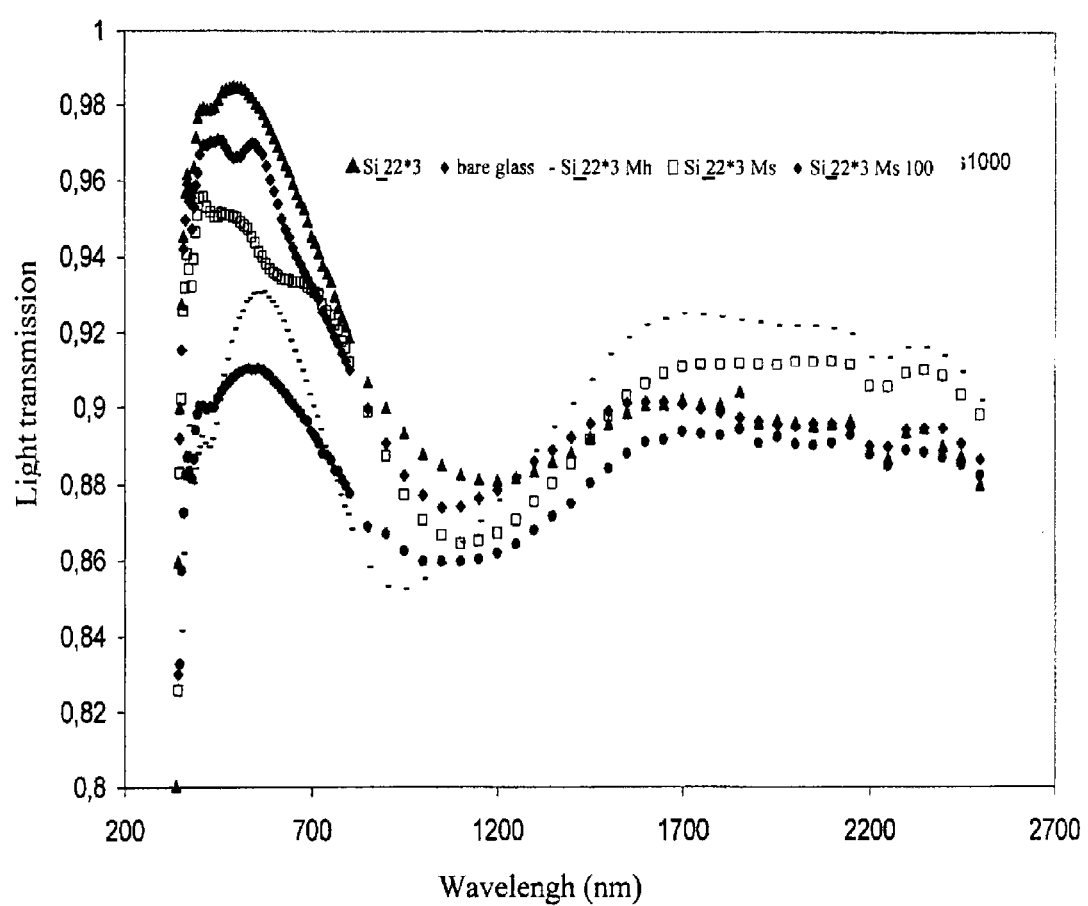

FIG. 8: shows light transmission spectra recorded in the visible range for different surfaces prepared during the different steps described in the present invention. See FIG. 10 for used terminology.

Figure 9A:
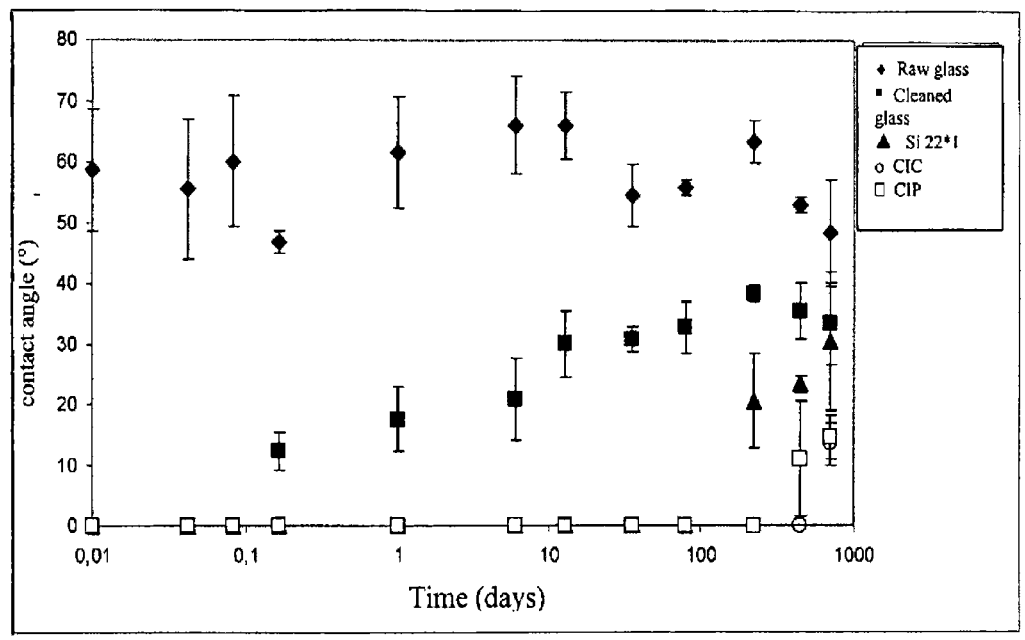
Figure 9B:
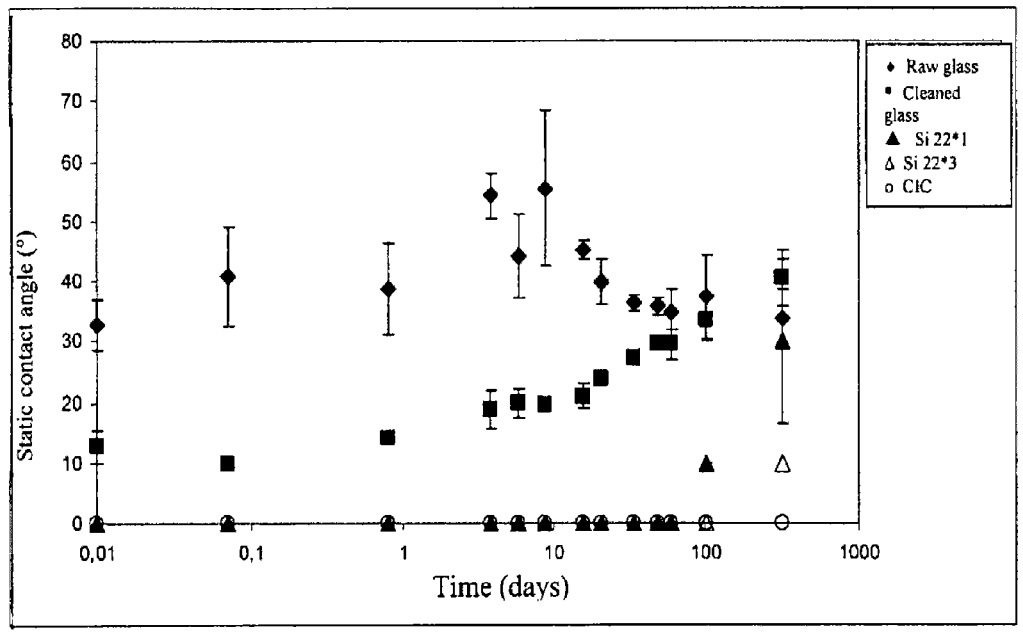

FIG. 9: shows the evolution over time of the static water contact angles measured for different surfaces prepared during the different steps described in the present invention. See FIG. 10 for used terminology. (A) samples stored in darkness in a cupboard, (B) sample stored in an exterior part of a building.

FIG. 10: shows the effect of the presence of different deposits on the antireflective and light diffusion properties has been examined.

EXAMPLE 5

The steps for forming the surfaces covered with a deposit according to a preferred embodiment of the invention are described below (and shown schematically in FIG. 1). The series of steps applied results in glass surfaces covered with one or more layers of inorganic nanoparticles that are possibly strengthened and include micro gaps in the form of hemispheres, the rate of surface coverage of which can be adjusted. The method of production comprises the following steps:

(1) Cleaning a support of 1.9 mm thick clear float glass is conducted by immersing this in a piranha mixture (3:1 v/v $H_2SO_4/H_2O_2$) for one hour followed by copious rinsing in water and drying in nitrogen. This allows the predominant portion of surface contaminants to be removed and a reproducible surface state to be obtained for each support.

(2) Immersion for a sufficient time to cover the cleaned glass with a layer of a cationic polyelectrolyte followed by washing. The cationic polyelectrolyte used is polyallylamine or PAH (Sigma Aldrich) in solution to $10^{-5}$ M/L with a pH=11, adjusted with a solution of 1M NaOH and with an ionic strength of $10^{-2}$ M adjusted with a 0.1 M NaCl solution. In this case, the cleaned glass is immersed for at least 30 minutes in a tank containing the aqueous solution of the polyelectrolyte PAH followed by washing operations by dilution. The washing operations conducted without the glass surfaces being placed in contact with the air before the end of the washing operations (they are therefore always covered by the deposit solution and/or washing solutions added), are ended after at least 12 times the volume initially necessary to cover the entire glass surface with the polyelectrolyte solution has been added in the deposition tank. Therefore, the washing operations are conducted in a succession of additions of ultra-pure water and recovery operations of the deposit solution thus diluted (final dilution of the initial PAH solution: 6 orders of magnitude). A complete drying in nitrogen follows.

(3) and (4) Immediately after the drying in step (2) the glass surface modified by the polyelectrolyte is immersed in a colloidal solution of microparticles for a sufficient period to deposit a layer of microparticles (step 3). This operation is followed by washing. The microparticles considered are of polystyrene (Invitrogen, IDC Latex, Latex sulphate 10% by mass, diameter ≥100 nm), the negative surface charges of which are given by sulphate groups. The glass surfaces covered with the ionised polyelectrolyte deposit (step (2)) are immersed for 120 minutes in a colloidal solution of polystyrene microparticles at 0.1% by weight in ultra-pure water, 5≤pH≤7. At the end of the 120 minutes washing is conducted by dilution in water then with isopropanol following a procedure similar to that described in (2): firstly, the same volume of water as that initially necessary to cover the entire glass surface with the deposit solution is added 6 times. Then, proceed in the same manner again 6 times with isopropanol (final dilution of the initial colloidal solution: 6 orders of magnitude). As in step (2), the surfaces are prevented from coming into contact with the air during the washing operations. After complete drying in the open air, the deposit of microparticles on the glass is subjected to a thermal treatment capable of causing these microparticles to creep (step (4)). In the case of the polystyrene microparticles a heating of 113° C. is applied for at minimum of 30 minutes. It is at this stage that hemispheres are formed as a result of the deformation of the polystyrene spheres. The diameter and the height of the hemispheres amount respectively to about 700 nm and 400 nm, these values being determined by atomic force microscopy.

(5) After drying in step (3) or the end of step (4), a new layer of cationic polyelectrolyte is added to the secured microparticles subjected to creep following a protocol identical to that of step (2) except that the glass is now covered with microparticles.

(6) Immediately after the drying of step (5), the glass surfaces formed at the end of step (5) are immersed in a colloidal solution of inorganic nanoparticles for a period of 30 minutes. This period results in a deposit with a thickness of 50 nm corresponding to the fixture of two layers of ionised inorganic nanoparticles. This step is followed by washing operations. The nanoparticles are nanoparticles of silicon oxide (Si-NPs) with a diameter of 22 nm (LUDOX® TM 50, Sigma Aldrich). The silanol groups present on the surface of these nanoparticles immersed in the aqueous solution described hereafter are negatively charged. The glass surfaces are immersed for at least 30 minutes in an aqueous colloidal solution at 0.1% by weight with a pH adjusted with a solution of 1M NaOH such as 8≤pH≤9 and ionic strength of 1=0.1M adjusted with NaCl. At the end of the 30 minutes, a washing operation is conducted by dilution with water then with isopropanol. As in step (3), the surfaces are prevented from coming into contact with the air during the washing operations. The washing operations applied proceed as follows: a volume of water equal to the volume initially necessary to treat the entire surface is added at least 6 times in succession. Then, the same volume of isopropanol is added at least 6 times. The glass can be merely put in contact with the air after the last washing with the solvent of lower surface tension. The glass is then left in the open air until completely dried.

(7) and (8) The prepared surfaces after step (6) are subjected to different thermal or chemical treatments to remove the microparticles, strengthen or strengthen and render functional the surfaces at the same time.

(7) To remove the polystyrene microparticles the thermal treatment is conducted in an oven for at least 20 minutes at a temperature in the range of between 450° and 600° C.

(8) After calcination the substrate obtained, formed by the glass support covered with a deposit of silicon oxide nanoparticles (Si-NPs) (step 6) having micro gaps, is subjected to a chemical treatment with the aim of simply strengthening the surfaces of the nanoparticles considered by using $SiCl_4$ at 0.1% by weight in anhydrous toluene. These $SiCl_4$ molecules dissolved in toluene polymerise on the surface of the nanostructures as soon as the surfaces of the nanoparticles are immersed in the toluene for a period of 24 h. The polymerisation creates covalent bridges between the inorganic nanoparticles. Prior to every application of the chemical treatment the surfaces covered with the nanoparticles are subjected, for at least 15 minutes, to an immersion in a piranha mixture (3:1 v/v $H_2SO_4/H_2O_2$).

An analysis with SEM (Leo 982 Gemini FEG Digital Scanning Microscope) of the distribution of polystyrene particles that are charged on the surface by sulphate groups, have a diameter of 500 nm and are fixed to the glass before thermal deformation (creep) is shown in FIG. 2. This clearly shows that the distribution of the particles tends towards an isotropic distribution. A measurement of the coverage rate of the surface with these particles gives a value of about 20%. At this stage, the sample obtained is translucent (see insert FIG. 2).

FIG. 3 illustrates the effect of the creep thermal treatment for the purpose of deforming the polystyrene particles that are charged on the surface by sulphate groups, have a diameter of 500 nm and are fixed to 1.9 mm thick clear float glass to give them a substantially hemispherical shape. The two images A and B respectively recorded with an SEM and an atomic force microscope, Nanoscope III A from Digital Instruments, clearly show a similar shape. A measurement of the dimensions of the hemispheres conducted by SEM arrives at a base width of the hemispheres of about 500 nm. The same type of measurement performed on the images recorded by AFM gives a base width of about 700 nm and a height of about 400 nm.

The deposits of the present invention, typically obtained by following the protocol described in steps (1) to (7) and repeating steps (5) and (6) three times (n=3) with polystyrene particles and silica nanoparticles with a diameter of 500 and 22 nm respectively, are shown in FIGS. 4 and 5. As shown in the insert of FIG. 4, the glass is transparent again. Moreover, the hemispherical shape of the gaps enclosed in these silica nanoparticles is evident in the three images. A measurement of the dimensions of these structures performed using images taken with AFM gives a base width of 500 nm and a height of about 400 nm.

An analysis of the surface chemistry of the coatings present at each step of the production process represented in FIG. 1 with polystyrene particles with a diameter of 500 nm and silica nanoparticles with a diameter of 22 nm has been conducted using X-ray photoelectron spectroscopy (or XPS). The analyses were conducted using a Kratos Axis Ultra spectrometer (Kratos Analytical—UK) fitted with an aluminium source (10 mA and 15 kV), a monochromator and 8 electron multipliers. In all cases, XPS enabled the presence of the expected deposits to be confirmed. FIG. 6A shows, for example, that the characteristic peaks of the protonated amine group at 399.5 V and non-protonated at 401.2 V of the polyallylamine polyelectrolyte are present on the glass modified by this polycation and absent on the bare glass. Moreover, this characteristic peak is found up to step 6. Its disappearance after calcination (step 7) confirms that the thermal treatment properly removes the ionised polyelectrolyte. The presence of polystyrene particles at the end of step 3 up to step 6 before calcination is also clearly demonstrated in FIG. 6B. In fact, a characteristic satellite peak ("shake up") of the polystyrene is found at 291.4 eV (insert of FIG. 6B) that disappears after calcination.

The effect of the presence of different deposits on the antireflective and light diffusion properties has been examined. While the former were evaluated by examining the light transmission and reflection by a Lambda 900 spectrometer with a 150 mm integrating sphere from Perkin Elmer, the latter were evaluated on the basis of the haze values recorded by a Hazegard XL-211 hazemeter with a 150 mm integrating sphere.

FIGS. 7, 8, and 10 show the results obtained. The designations used in these Figures are indicated in FIG. 10 where the "bare glass" is a glass cleaned using a piranha solution, for example.

They show that the gain in light transmission observed in the visible in particle with the deposits of the present invention is essentially caused by the presence of the 22 nm layers of silica nanoparticles. In fact, as shown by test samples covered solely with silica nanoparticles with a diameter of 22 nm and without micro gaps (Si_22*3–n=3 with n=the number of repetitions of steps 5 and 6—and Si_22*1–n=1), the increase in light transmission (FIG. 7A) concomitantly with the decrease in light reflection (FIG. 7B) intensifies with the increase in the number of layers of nanoparticles deposited while retaining a haze close to that of a bare glass of around 0.1%. However, beyond 4 repetitions, i.e. 8 layers of silica nanoparticles, steps 5 and 6 (or steps (d) and (d')), a degradation in the antireflective properties is observed, especially in the visible range. Therefore, this is a maximum number of repetitions of steps 5 and 6 to be applied. This is also observed in the case where micro gaps are present (data not shown).

The main effect of the micro gaps incorporated into the deposits of the invention is to benefit the diffusion of light (FIG. 10). In fact, by comparison with a test sample without micro gaps that is subjected to three applications of nanoparticles (Si_22*3–n=3), the introduction of hemispherical micro gaps increases the haze (sample "Si_22*3 Mh"). If this is compared with a sample in which the micro gaps are more significant in volume because step (4) relating to the thermal creep treatment was not applied (sample "Si_22*3Ms"), it is evident that the haze increases further. This also applies but to a less pronounced degree in the case where a single application of nanoparticles is conducted (n=1, sample without micro gaps Si_22*1, with hemispherical micro gaps Si_22*1 Mh and with spherical micro gaps Si_22*1Ms). This is further increased in the case where the microparticles used have a larger diameter (1000 nm) and have not been subject to creep (sample "Si_22*3Ms1000").

Whatever configuration is considered, the examples show that the covered support of the invention has better antireflective properties than those obtained with a bare glass. With a constant thickness of the deposit of inorganic nanoparticles, e.g. of about 150 nm, for a deposit with n=3, it may even be observed that the increase in volume of the micro gaps through the absence of creep and/or the increase in diameter of the microparticles can improve the antireflective properties in particular in the visible range (FIG. 8).

The increase in the coverage rate of the micro gaps (data not shown) can also benefit the increase in haze (samples "Si_22*3Ms(d+)" and "Si_22*3Ms1000(d+)" in FIG. 10) while retaining better antireflective properties than that of a bare glass.

The micro gaps present between the silica nanoparticles cause an improvement in the antireflective properties in particular in the visible range while the micro gaps assure a controlled diffusion of the light and in some cases also benefits an improvement in the antireflective properties in the visible.

Measurements of the static water contact angle (FIG. 9) on surfaces prepared after calcination in step 7 (sample "Si_22*1 Mh"—FIG. 10), thus having roughness on two scales resulting from the micro- and the nanostructures, were conducted using the sessile drop method using modified "Electronish Ontwerpbureau de Boer" equipment. FIG. 9 (A) depicts samples stored in darkness in a cupboard, whereas FIG. 9 (B) depicts samples stored in an exterior part of a building.

The contact angles measured just after calcination are 10° lower and the water drops deposited instantaneously spread to form a film of water. This result is identical to that obtained for a glass surface freshly covered with a layer of silicon oxide nanoparticles with a diameter of about 20 nm without micro gaps (sample "Si_22*1" in FIG. 9-FIG. 10). This test sample was made in order to evaluate the effect of the micrometric roughness on the contact angles measured.

Therefore, it is clearly evident from these results that it is not possible with the technique used to distinguish between the two surfaces with a highly hydrophilic character just after their production. Examination of the evaluation kinetics of the contact angles of these surfaces was also conducted and is presented in FIG. 9. As a comparison, other surfaces than those mentioned above were analysed: a bare glass that has not been cleaned ("bare glass" sample) and a bare glass cleaned by immersion in a piranha solution ("cleaned glass" sample). While it is not possible to distinguish between the wettability of the two surfaces covered with silica nanoparticles over a long period, after about 7 months in an indoor storage and about 3.5 months in an outer part of a building, the glass covered with silica nanoparticles without micro gaps (Si__22*1) begins to lose its highly hydrophilic properties, in contrast to that including micro gaps. Therefore, the roughness on two scales as a result of the combination of micro- and nano-gaps effects an improvement in the longevity of the highly hydrophilic properties, which is observed even at duration of about 15 months in an indoor situation and 11 months when placed out, in contact with the exterior.

This is therefore also a determining effect of the invention.

The invention claimed is:

1. A process comprising:
    applying a solution comprising a first polyelectrolyte that comprises an ionized functional group to a transparent support, followed by washing and drying the support, thereby obtaining a first polyelectrolyte deposit on the support;
    applying a solution comprising polymer microparticles that comprise an ionized group with a charge opposed to a charge of the first polyelectrolyte deposit to the first polyelectrolyte deposit, followed by washing the first polyelectrolyte deposit, thereby obtaining a deposit of the polymer microparticles on the first polyelectrolyte deposit;
    covering the deposit of the polymer microparticles with a solution comprising a second polyelectrolyte that comprises an ionized functional group with a charge opposed to the charge of the polymer microparticles, followed by washing and drying the deposit of the polymer microparticles, thereby obtaining a second polyelectrolyte deposit;
    applying a solution comprising ionized inorganic nanoparticles having a surface charge opposed to the charge of the second polyelectrolyte to the second polyelectrolyte deposit, followed by washing the second polyelectrolyte deposit, thereby obtaining a first layer of ionized inorganic nanoparticles; and
    removing the deposit of the polymer microparticles and the first and second polyelectrolyte deposits, thereby obtaining a deposit of inorganic nanoparticles on the transparent support,
    wherein the deposit of inorganic nanoparticles comprises micro gaps.

2. The process of claim 1, wherein the transparent support is an inorganic material, an organic material, or a combination thereof.

3. The process of claim 1, wherein applying the solution comprising the first polyelectrolyte comprises wetting the transparent support in an aqueous solution of ionized polyelectrolyte.

4. The process of claim 3,
    wherein a pH of the first polyelectrolyte solution is between 1 and 13,
    an ionic strength of the first polyelectrolyte solution is between $10^{-6}$ M and 1 M, and
    an adjusted concentration of the polyelectrolyte in the first polyelectrolyte solution is between $10^{-6}$ M and 1 M.

5. The process of claim 1, wherein applying the solution comprising the first polyelectrolyte comprises applying the solution for between 1 minute and 3 hours.

6. The process of claim 1,
    wherein a pH of the solution comprising polymer microparticles is between 1 and 13,
    an ionic strength of the solution comprising polymer microparticles is between $10^{-6}$ and 1 M, and
    an adjusted concentration of microparticles in the solution comprising polymer microparticles is between 0.001% by weight and 50% by weight.

7. The process of claim 1,
    wherein a pH of the solution comprising ionized inorganic nanoparticles is between 1 and 13,
    an ionic strength of the solution comprising ionized inorganic nanoparticles is between $10^{-6}$ and 1 M, and
    an adjusted concentration of nanoparticles in the solution comprising ionized inorganic nanoparticles is between 0.01% by weight and 50% by weight.

8. The process of claim 1, further comprising:
    applying an adequate temperature to cause creep of the polymer microparticles in the deposit of the polymer microparticles, prior to covering the deposit of the polymer microparticles.

9. The process of claim 1, further comprising:
    applying a second layer of ionized inorganic nanoparticles to the first layer of ionized inorganic nanoparticles.

10. The process of claim 9, further comprising:
    covering the first layer of ionized inorganic nanoparticles with a layer of polyelectrolyte comprising an ionized functional group with a charge opposed to the surface charge of the ionized inorganic nanoparticles in the first layer of ionized inorganic nanoparticles, prior to applying the second layer of ionized inorganic nanoparticles.

11. The process of claim 1, wherein the removing comprises heating the support, or dissolving a base polymer of the first and second polyelectrolytes and the polymer microparticles.

12. The process of claim 1, further comprising:
    strengthening the deposit of inorganic nanoparticles after the removing.

13. The process of claim 1, wherein a composition of the solution comprising the first polyelectrolyte is also a composition of the solution comprising the second polyelectrolyte.

14. The process of claim 1, wherein the transparent support is glass, a polycarbonate, or a poly(methyl methacrylate)-based polymer.

15. The process of claim 1, wherein the first polyelectrolyte, the second polyelectrolyte, or both comprise at least one electrolyte selected from the group consisting of polyethyleneimine, poly(allylamine hydrochloride), and poly diallyldimethylammonium chloride.

16. The process of claim 1, wherein a diameter of the ionized inorganic nanoparticles is from 5 nm to 50 nm.

17. The process of claim 1, wherein applying the solution comprising the second polyelectrolyte comprises applying the solution for between 1 minute and 3 hours.

* * * * *